(12) United States Patent
Nakatani

(10) Patent No.: US 11,196,789 B2
(45) Date of Patent: Dec. 7, 2021

(54) RECORDING DEVICE AND RECORDING METHOD

(71) Applicant: PANASONIC INTELLECTUAL PROPERTY MANAGEMENT CO., LTD., Osaka (JP)

(72) Inventor: Tokuo Nakatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/969,000

(22) PCT Filed: Sep. 13, 2019

(86) PCT No.: PCT/JP2019/036000
§ 371 (c)(1),
(2) Date: Aug. 11, 2020

(87) PCT Pub. No.: WO2020/059644
PCT Pub. Date: Mar. 26, 2020

(65) Prior Publication Data
US 2021/0029188 A1 Jan. 28, 2021

(30) Foreign Application Priority Data
Sep. 20, 2018 (JP) .............................. JP2018-176327

(51) Int. Cl.
*H04L 29/06* (2006.01)
*H04N 21/2662* (2011.01)
*H04N 21/4147* (2011.01)

(52) U.S. Cl.
CPC .......... *H04L 65/607* (2013.01); *H04L 65/601* (2013.01); *H04N 21/2662* (2013.01); *H04N 21/4147* (2013.01)

(58) Field of Classification Search
CPC ....... H04L 65/60; H04L 65/607; H04N 21/25; H04N 21/266; H04N 21/2662; H04N 21/40; H04N 21/4147
See application file for complete search history.

(56) References Cited

U.S. PATENT DOCUMENTS

| | | | | |
|---|---|---|---|---|
| 7,546,617 B1 * | 6/2009 | Kienzle | .................. | G06Q 30/02 705/14.73 |
| 7,865,929 B1 * | 1/2011 | Inoue | .................. | H04N 9/7925 725/151 |

(Continued)

FOREIGN PATENT DOCUMENTS

| | | |
|---|---|---|
| JP | 2002-084497 A | 3/2002 |
| JP | 2003-174623 A | 6/2003 |

OTHER PUBLICATIONS

International Search Report and Written Opinion dated Nov. 12, 2019 in International Application No. PCT/JP2019/036000; with partial English translation.

*Primary Examiner* — Boris D Grijalva Lobos
(74) *Attorney, Agent, or Firm* — McDermott Will and Emery LLP

(57) ABSTRACT

A recording device records an encoded stream in a recording medium. The recording device includes: an obtainer that obtains the encoded stream; a decoder that decodes the encoded stream obtained; and a controller that selectively performs, in accordance with a predetermined setting, first control to record the encoded stream in the recording medium, when the encoded stream obtained is undecodable by the decoder, or second control not to record the encoded stream, when the encoded stream obtained is undecodable by the decoder.

5 Claims, 7 Drawing Sheets

(56) References Cited

U.S. PATENT DOCUMENTS

| | | | | |
|---|---|---|---|---|
| 8,238,728 B2* | 8/2012 | Nishio | | G11B 27/034 |
| | | | | 386/353 |
| 10,237,580 B2* | 3/2019 | Rachwalski | | H04N 19/583 |
| 2002/0051623 A1 | 5/2002 | Nakatani et al. | | |
| 2002/0114360 A1* | 8/2002 | Perlman | | H04N 21/434 |
| | | | | 370/536 |
| 2003/0235391 A1* | 12/2003 | Gates | | H04N 5/76 |
| | | | | 386/295 |
| 2004/0125816 A1* | 7/2004 | Xu | | H04N 21/23406 |
| | | | | 370/411 |
| 2005/0144646 A1* | 6/2005 | Lecrom | | H04N 21/458 |
| | | | | 725/100 |
| 2006/0015580 A1* | 1/2006 | Gabriel | | H04N 21/2389 |
| | | | | 709/219 |
| 2006/0067409 A1* | 3/2006 | Onoda | | H04N 19/117 |
| | | | | 375/240.25 |
| 2006/0168615 A1* | 7/2006 | Igler | | H04N 21/43637 |
| | | | | 725/32 |
| 2009/0202068 A1* | 8/2009 | Qureshi | | H04L 9/0838 |
| | | | | 380/44 |
| 2010/0118115 A1* | 5/2010 | Takahashi | | H04N 1/00291 |
| | | | | 348/24 |
| 2010/0157817 A1* | 6/2010 | Mergler | | H04W 36/30 |
| | | | | 370/252 |
| 2011/0158607 A1* | 6/2011 | Tariolle | | H04N 5/775 |
| | | | | 386/248 |
| 2011/0265114 A1* | 10/2011 | Legrand | | H04N 21/23418 |
| | | | | 725/32 |
| 2014/0086333 A1* | 3/2014 | Wang | | H04N 21/8451 |
| | | | | 375/240.25 |
| 2014/0304758 A1* | 10/2014 | Tanaka | | H04N 21/43615 |
| | | | | 725/116 |
| 2015/0036757 A1* | 2/2015 | Schink | | H04N 19/136 |
| | | | | 375/240.29 |
| 2015/0199383 A1* | 7/2015 | Roimela | | G06F 16/2246 |
| | | | | 707/741 |
| 2017/0318323 A1* | 11/2017 | Wang | | H04N 21/4341 |

* cited by examiner

FIG. 6

| | | | | | | |
|---|---|---|---|---|---|---|
| RECORDING LIST | | | | | | |
| 8K | ⚠ | 8/21 | 12:00 | BS 23 | DRAMA SERIES A | |
| | | 8/21 | 19:00 | TD 77 | NEWS B | |
| 8K | ⚠ | 8/22 | 12:00 | BS 23 | DRAMA SERIES A | |
| 4K | | 8/23 | 08:00 | BS 13 | DOCUMENTARY C | |
| | U | 8/23 | 10:00 | TD 11 | INFORMATION PROGRAM D | |
| 8K | U ⚠ | 8/23 | 12:00 | BS 23 | DRAMA SERIES A | |

RECORDING DEVICE AND RECORDING METHOD

CROSS-REFERENCE OF RELATED APPLICATIONS

This application is the U.S. National Phase under 35 U.S.C. § 371 of International Patent Application No. PCT/JP2019/036000, filed on Sep. 13, 2019, which in turn claims the benefit of Japanese Application No. 2018-176327, filed on Sep. 20, 2018, the entire disclosures of which Applications are incorporated by reference herein.

TECHNICAL FIELD

The present disclosure relates to a recording device and a recording method.

BACKGROUND ART

Patent Literature (PTL) 1 discloses a video data recording device that detects a change in a copy protection signal of input video data from copy permission to copy prohibition and stops recording the video data upon detection of the change.

CITATION LIST

Patent Literature

PTL 1: Japanese Unexamined Patent Application Publication No. 2002-84497

SUMMARY OF THE INVENTION

Technical Problem

The technique according to PTL 1 fails to assume that an encoded stream, such as video data, undecodable by a decoder of the recording device is input to the recording device. Accordingly, when the input encoded stream is undecodable by the decoder of the recording device, the recording device fails to properly determine whether or not to record the encoded stream.

The present disclosure provides a recording device and a recording method that properly determine whether or not to record an undecodable encoded stream in a recording medium.

Solutions to Problem

A recording device according to an aspect of the present disclosure records an encoded stream in a recording medium. The recording device includes: an obtainer that obtains the encoded stream; a decoder that decodes the encoded stream obtained; and a controller that selectively performs, in accordance with a predetermined setting, first control to record the encoded stream in the recording medium, when the encoded stream obtained is undecodable by the decoder, or second control to not record the encoded stream, when the encoded stream obtained is undecodable by the decoder.

The comprehensive or specific aspect may be implemented by a system, a method, an integrated circuit, a computer program, or a computer-readable recording medium such as a CD-ROM, or any combination of systems, methods, integrated circuits, computer programs, and recording media.

Advantageous Effect of Invention

The recording device and the recording method according to the present disclosure properly determine whether or not to record an undecodable encoded stream in the recording medium.

BRIEF DESCRIPTION OF DRAWINGS

FIG. 6 shows an example GUI including a recording list.

DESCRIPTION OF EXEMPLARY EMBODIMENT

Figure 1:
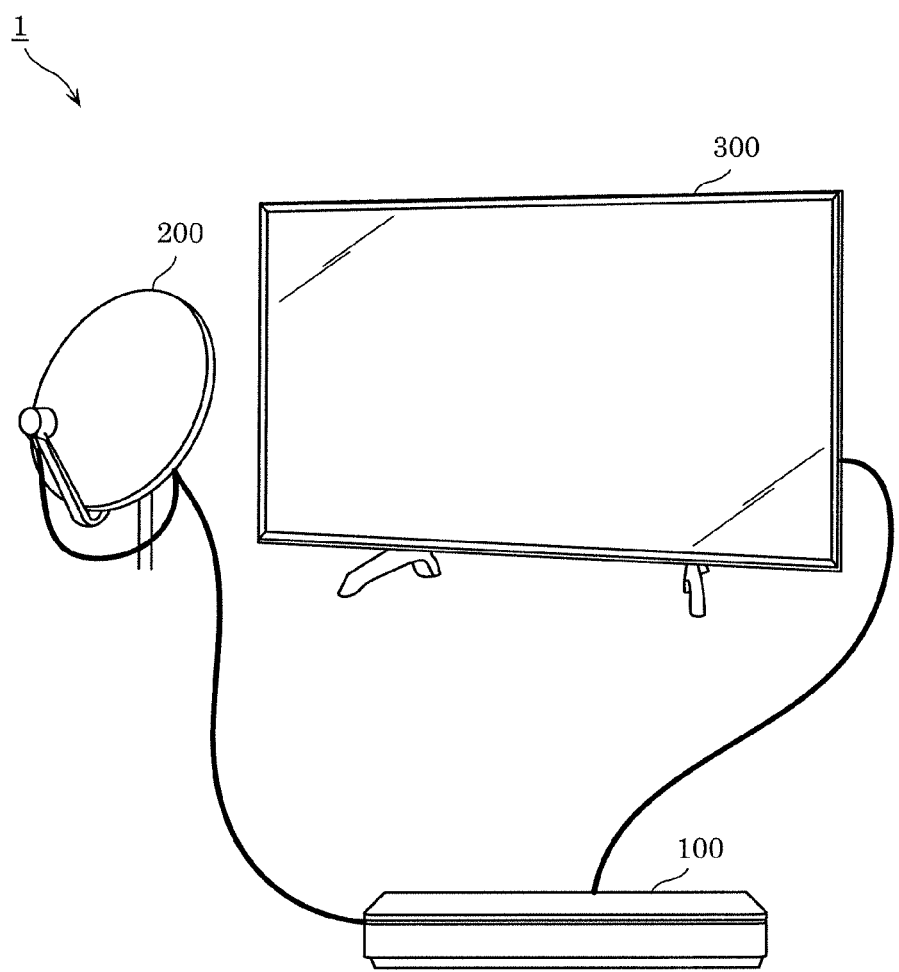
FIG. 1 shows an outline of a video system according to an embodiment.

A recording device according to the present disclosure records an encoded stream in a recording medium. The recording device includes: an obtainer that obtains the encoded stream; a decoder that decodes the encoded stream obtained; and a controller that selectively performs, in accordance with a predetermined setting, first control to record the encoded stream in the recording medium, when the encoded stream obtained is undecodable by the decoder, or second control to not record the encoded stream, when the encoded stream obtained is undecodable by the decoder.

With this configuration, assume that the encoded stream is undecodable by the decoder. Even in this case, the first control is performed when there is a setting to record the encoded stream, whereas the second control is performed when there is a setting not to record the encoded stream. It is thus properly determined whether to record the encoded stream undecodable by the decoder in the recording medium or not to record the encoded stream undecodable by the decoder.

For example, when a user selects the setting to record an encoded stream undecodable by the decoder to reproduce the encoded stream using another piece of equipment, the encoded stream is recordable in the recording medium. When a user selects the setting to not record an encoded stream undecodable by the decoder, the recording device does not record the unreproducible encoded stream. This allows lower consumption of the recording capacity of the recording medium.

The controller may determine that the encoded stream is undecodable by the decoder, when a required processing capacity regarding a processing speed required for decoding the encoded stream exceeds a processing capacity of the decoder.

Assume that the obtained encoded stream requires decoding at a processing speed higher than the processing speed of the decoder. In this case, the device properly determines whether to perform the first control of the encoded stream or the second control of the encoded stream in accordance with the predetermined setting.

The encoded stream may include a video stream. The required processing capacity may be a processing capacity required for decoding the video stream having a resolution equal to or higher than a predetermined resolution.

In this configuration, whether the encoded stream is undecodable by the decoder is determined using the resolution of the video stream included in the encoded stream, which facilitates the determination.

When the predetermined setting indicates that the second control is to be performed and the video stream includes a first video stream having a resolution equal to or higher than the predetermined resolution and a second video stream having a resolution lower than the predetermined resolution, the controller may record the second video stream in the recording medium without recording the first video stream.

When the video stream including a mixture of the first video stream and the second video stream is obtained and the second control is performed, only the second video stream is, out of the first video stream and the second video stream, recordable in the recording medium.

The recording device may further include: a memory that stores the predetermined setting; a receiver that receives an input of a user; and an updater that updates, in accordance with the input, the predetermined setting stored in the memory to a first setting indicating that the first control is to be performed or a second setting indicating that the second control is to be performed. The controller may selectively perform the first control or the second control in accordance with the predetermined setting stored in the memory when the obtainer obtains the encoded stream.

This configuration causes the device to selectively perform the first control or the second control in accordance with the setting selected by the user. This leads to proper selection of the first control or the second control.

The recording device may further include: an outputter that generates a list of one or more encoded streams recorded in the recording medium, and outputs the list to a display device. In the list, first display may indicate a certain encoded stream undecodable by the decoder, whereas second display may indicate another encoded stream. A display form of the first display may be different from a display form of the second display and represent that the certain encoded stream is unreproducible by the recording device.

With this configuration, even when the decoder cannot decode an encoded stream, the device uses a display form indicating the fact that the certain encoded stream recorded in the recording medium is not reproducible in the display form of the first display. Accordingly, a user easily identifies, in the list, the encoded stream unreproducible by the recording device.

Now, an embodiment will be described in detail with reference to the drawings as appropriate. Note that unnecessarily detailed description may be omitted. For example, detailed description of already well-known matters or duplicated description of substantially the same configurations may be omitted. This is to avoid unnecessarily redundant description and for easier understanding of those skilled in the art.

The inventor provides the appended drawings and the following description to cause those skilled in the art to sufficiently understand the present disclosure and does not intend to limit the subject matters of the claims with the drawings and the description.

Embodiment

Now, an embodiment will be described with reference to FIGS. 1 to 7.

1. Configuration

FIG. 1 shows an outline of a video system according to the embodiment.

As shown in FIG. 1, video system 1 includes antenna 200, recording device 100, and display device 300. Antenna 200 receives broadcast waves. Recording device 100 records encoded streams obtained from the broadcast waves received by antenna 200. Display device 300 displays videos output from recording device 100. The encoded streams include, for example, video streams and audio streams.

Antenna 200 is for receiving broadcast waves of, for example, advanced BS/CS digital broadcast. Note that antenna 200 may receive broadcast waves of not only the broadcast waves described above but terrestrial digital broadcast.

Recording device 100 records the obtained encoded streams in a recording medium in real time. The recording medium may be, for example, a hard disk drive (HDD) or a non-volatile memory such as a solid-state drive (SSD), or an optical disk such as a Blu-ray disc (BD, registered trademark) or a digital versatile disc (DVD). Alternatively, recording device 100 may decode encoded streams into video signals, or output obtained video signals to display device 300. Recording device 100 may decode encoded streams obtained from broadcast waves, or encoded streams recorded in the recording medium. Recording device 100 may be a BD recorder, a DVD recorder, or an HDD recorder, for example.

Display device 300 displays videos indicated by the video signals output from recording device 100. Display device 300 may be a television (TV) or a display, for example.

Figure 2:
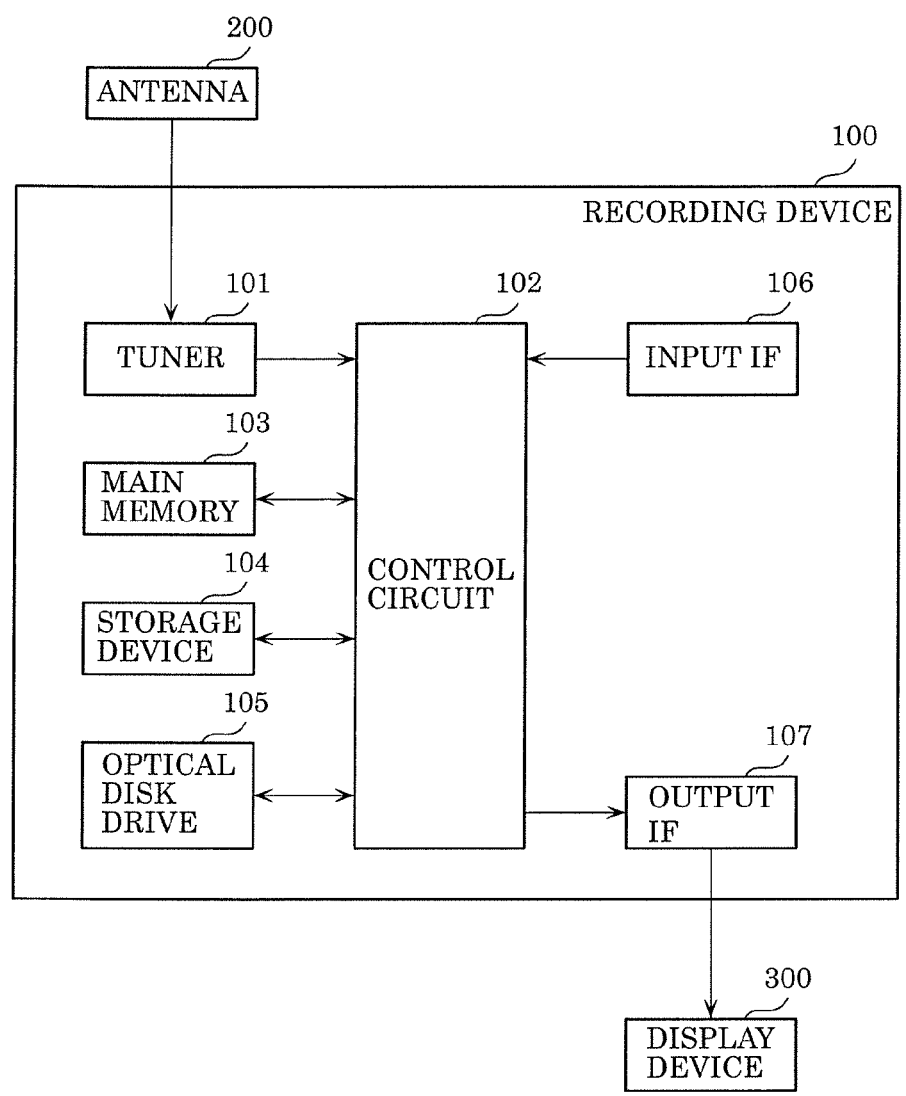
FIG. 2 shows an example hardware configuration of a recording device according to the embodiment.

FIG. 2 shows an example hardware configuration of the recording device according to the embodiment.

As shown in FIG. 2, recording device 100 includes tuner 101, control circuit 102, main memory 103, storage device 104, optical disk drive 105, input IF 106 and output IF 107.

Tuner 101 outputs broadcast waves (encoded streams) of digital broadcast received by antenna 200 to control circuit 102.

Control circuit 102 is a processing circuit that executes predetermined processing of the encoded streams. Control circuit 102 is a processing circuit that implements the functions of recording device 100. Control circuit 102 may be a general-purpose processor, such as a CPU, executing predetermined control programs or a dedicated circuit. That is, the functions of recording device 100 may be implemented by software or hardware.

Main memory 103 is a volatile storage area used as a work area for control circuit 102 executing programs. Main memory 103 is a random-access memory (RAM), for example. Note that main memory 103 may be included in control circuit 102.

Storage device 104 stores the predetermined control programs. Storage device 104 may be a recording medium for recording the encoded streams. The storage area storing the predetermined control programs is different from the storage area for recording the encoded streams. Storage device 104 may include a plurality of recording media.

Optical disk drive 105 is equipment that reads information such as encoded streams form an optical disk or writes information such as encoded streams to an optical disk.

Input IF 106 is an interface for receiving an input from a person. Input IF 106 is an interface that receives an input from a remote controller, for example, via wireless communication such as infrared communication. Input IF 106 is not limited to the interface described above but may be a pointing device such as a mouse, a touch pad, a touch panel, or a trackball, or may be a keyboard. Input IF 106 may be an interface that receives an input from a user not only via wireless communication but wired communication.

Output IF 107 is an interface for outputting video signals to display device 300. Output IF 107 may be a high-definition multimedia interface (HDMI, registered trademark), for example.

Figure 3:
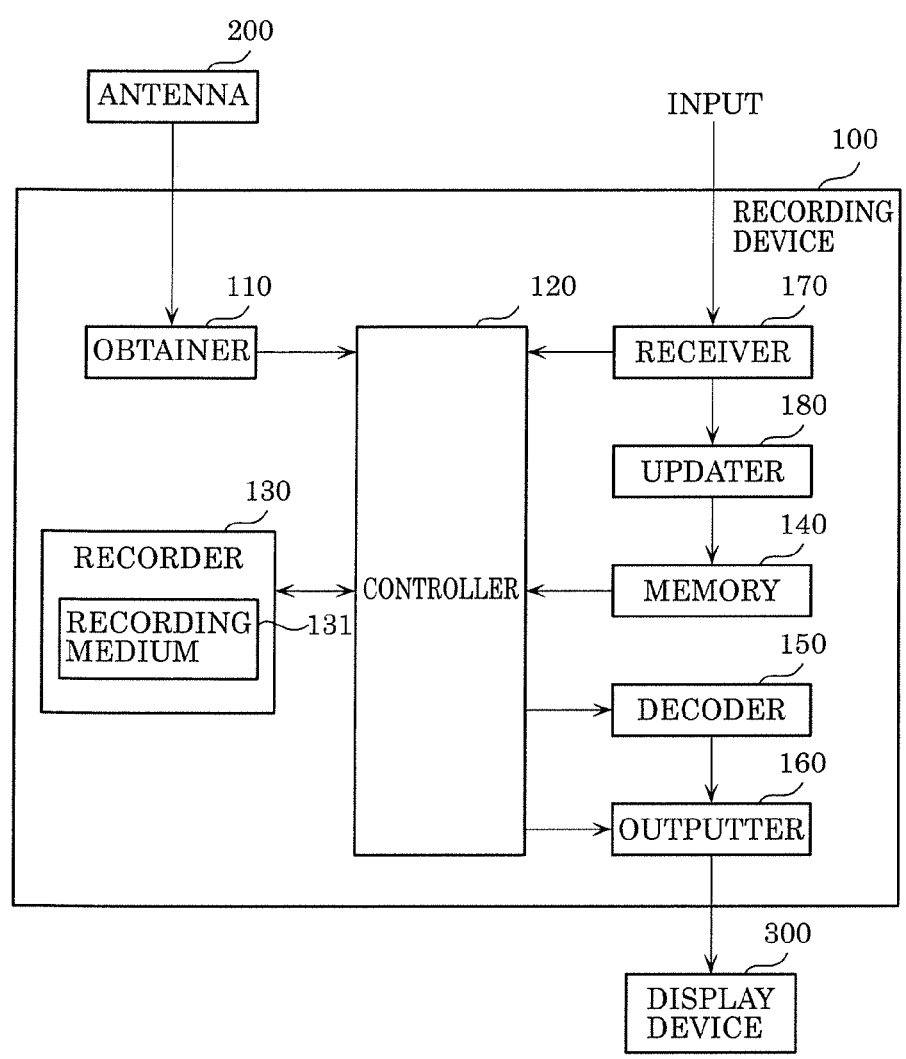
FIG. 3 shows example functional configurations of the recording device according to the embodiment.

FIG. 3 shows example functional configurations of the recording device according to the embodiment.

As shown in FIG. 3, recording device 100 includes, as functional configurations, obtainer 110, controller 120, recorder 130, memory 140, decoder 150, outputter 160, receiver 170, and updater 180.

Obtainer 110 obtains encoded streams. Obtainer 110 obtains the encoded streams from broadcast waves, for example. Obtainer 110 is achieved by tuner 101, control circuit 102, main memory 103, and storage device 104, for example.

Controller 120 selectively performs first control or second control in accordance with the predetermined setting. The first control is performed using recorder 130 to record the encoded stream in recording medium 131, when an encoded stream obtained by obtainer 110 is undecodable by decoder 150. The second control is performed to not record the encoded stream, when the obtained encoded stream is undecodable by decoder 150.

Controller 120 obtains the predetermined setting, for example, by reading the setting from memory 140. That is, when obtainer 110 obtains the encoded streams, controller 120 selectively performs the first control or the second control in accordance with the predetermined setting stored in memory 140.

Controller 120 determines whether an encoded stream is decodable by decoder 150 in accordance with a required processing capacity regarding a processing speed required for decoding the encoded stream. When the required processing capacity exceeds the processing capacity of decoder 150, controller 120 determines that the encoded stream is undecodable by decoder 150. The required processing capacity is the processing capacity required for, for example, decoding a video stream having a resolution equal to or higher than a predetermined resolution (e.g., 8K). That is, for example, when a video stream included in an encoded stream has a resolution equal to or higher than the predetermined resolution, controller 120 determines that decoder 150 cannot decode the encoded stream including the video stream.

Controller 120 analyzes a video stream of an encoded stream to detect the resolution of the video stream and determine whether the encoded stream is decodable by decoder 150, based on the detected resolution. Controller 120 may analyze an I-picture or an intra random access point (IRAP) picture contained in a payload of a packet constituting the video stream to detect the resolution of the video stream. Controller may refer to the header of the packet constituting the video stream to detect the resolution. Alternatively, controller 120 may detect the resolution from resolution information contained in MMT-SI that is control information. The resolution information is contained in a video component descriptor, for example.

Figure 4:
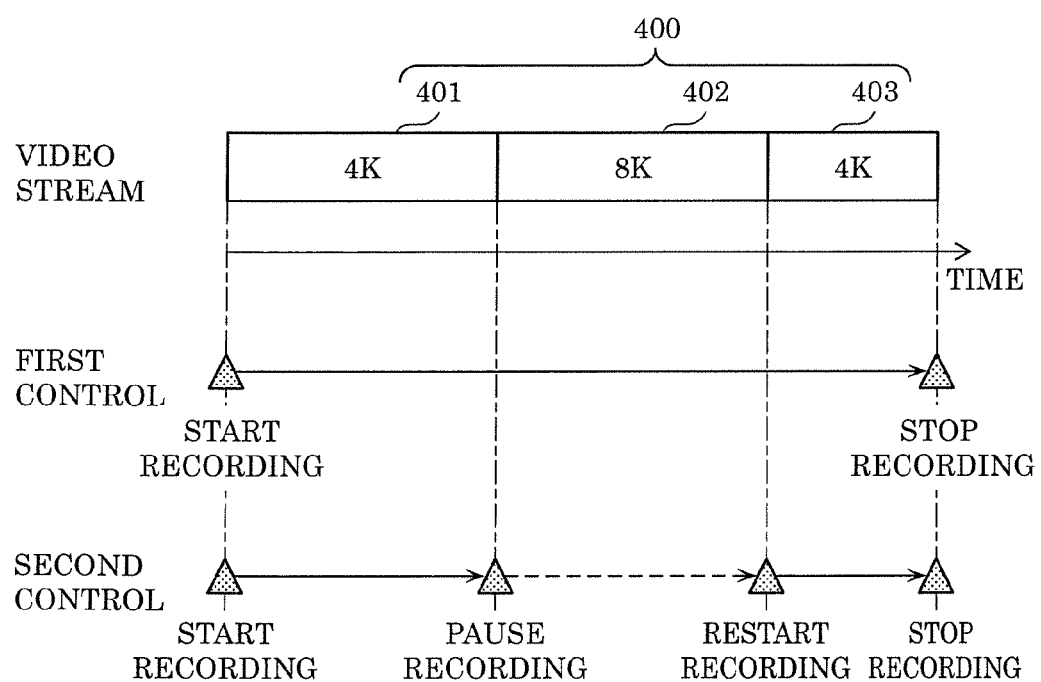
FIG. 4 illustrates control in recording a video stream including a mixture of 4K and 8K video streams.

Assume that the predetermined setting indicates that the second control is to be performed. In addition, the video stream includes a first video stream (e.g., an 8K video stream) having a resolution equal to or higher than the predetermined resolution and a second video stream (e.g., 2K and 4K video streams) having a resolution lower than the predetermined resolution. In this case, controller 120 records the second video stream in recording medium 131 using recorder 130 without recording the first video stream. For example, as shown in FIG. 4, recording of video stream 400 including a mixture of 4K video streams 401 and 403 and 8K video stream 402 will be described as an example. Video stream 400 includes the streams in the order of 4K video stream 401, 8K video stream 402, and 4K video stream 403.

In the first control, controller 120 records both the 4K video streams and the 8K video stream, and thus starts recording at the beginning of video stream 400 and stops recording at the end of video stream 400. That is, the recorded video stream includes 4K video streams 401 and 403 and 8K video stream 402.

In the second control, controller 120 records a 4K video stream but does not record any 8K video stream. Controller 120 starts thus recording at the beginning of 4K video stream 401 and pauses recording at the end of 4K video stream 401 (i.e., at the beginning of 8K video stream 402). Controller 120 restarts recording at the beginning of 4K video stream 403 (i.e., at the end of 8K video stream 402) and stops recording at the end of 4K video stream 403. That is, the recorded video stream includes 4K video streams 401 and 403 but does not include any 8K video stream 402.

Controller 120 may create a graphical user interface (GUI) for receiving an input from a user. A GUI may be for changing the settings stored in advance in memory 140 or reproducing (i.e., decoding), in recording device 100, encoded streams recorded in recording medium 131. Controller 120 may create, for example, a list of one or more encoded streams recorded in recording medium 131 and output the GUI including the list to display device 300. Note that the list may not be included in any GUI but may be information including a table and a string. Controller 120 creates a GUI in accordance with an input from a user and a predetermined program.

Controller 120 is achieved by control circuit 102, main memory 103, and storage device 104, for example.

Recorder 130 is a processor that records encoded streams in recording medium 131 in accordance with control of controller 120. In the first control, recorder 130 records, in recording medium 131, the encoded streams obtained by obtainer 110. In the second control, recorder 130 records, ones of the encoded stream obtained by obtainer 110 other than the encoded streams including video streams having a resolution equal to or higher than the predetermined resolution. Recorder 130 is achieved by control circuit 102, main memory 103, storage device 104, and optical disk drive 105, for example. Note that recording medium 131 may be, as described above, for example, a hard disk drive (HDD), a non-volatile memory such as a solid-state drive (SSD), an optical disk such as a Blu-ray disc (BD, registered trademark), an Ultra HD/BD, or a digital versatile disc (DVD).

Memory 140 stores the predetermined setting. Memory 140 stores, as the predetermined setting, a first setting indicating that controller 120 performs the first control or a second setting indicating that controller 120 performs the second control. Memory 140 is achieved by storage device 104, for example.

Decoder 150 decodes the encoded streams obtained by obtainer 110 and outputs, to outputter 160, video signals obtained through the decoding. The encoded streams include those decodable by decoder 150 and those undecodable by decoder 150 depending on the processing capacity of decoder 150. In this embodiment, the encoded streams undecodable by decoder 150 includes those having a resolution equal to or higher than the predetermined resolution (i.e. 8K). Decoder 150 is achieved by control circuit 102 and main memory 103, for example.

Outputter 160 outputs the video signals decoded by decoder 150 or the GUI created by controller 120 to display device 300. Outputter 160 is achieved by control circuit 102, main memory 103, storage device 104, and output IF 107, for example.

Receiver 170 is a processor that receives inputs from users. Receiver 170 may receive an input signal indicating an input from a user, for example, to a predetermined button of a remote controller. Alternatively, receiver 170 may receive an input signal indicating an input through a remote controller to a GUI being output from outputter 160. Receiver 170 is achieved by control circuit 102, main memory 103, storage device 104, and input IF 106, for example.

Updater 180 updates the predetermined setting stored in memory 140 to the first setting or the second setting in accordance with an input received by receiver 170. Updater 180 is achieved by control circuit 102, main memory 103, and storage device 104, for example.

Now, specific examples of GUIs 301 and 303 will be described with reference to FIG. 5.

Figure 5:
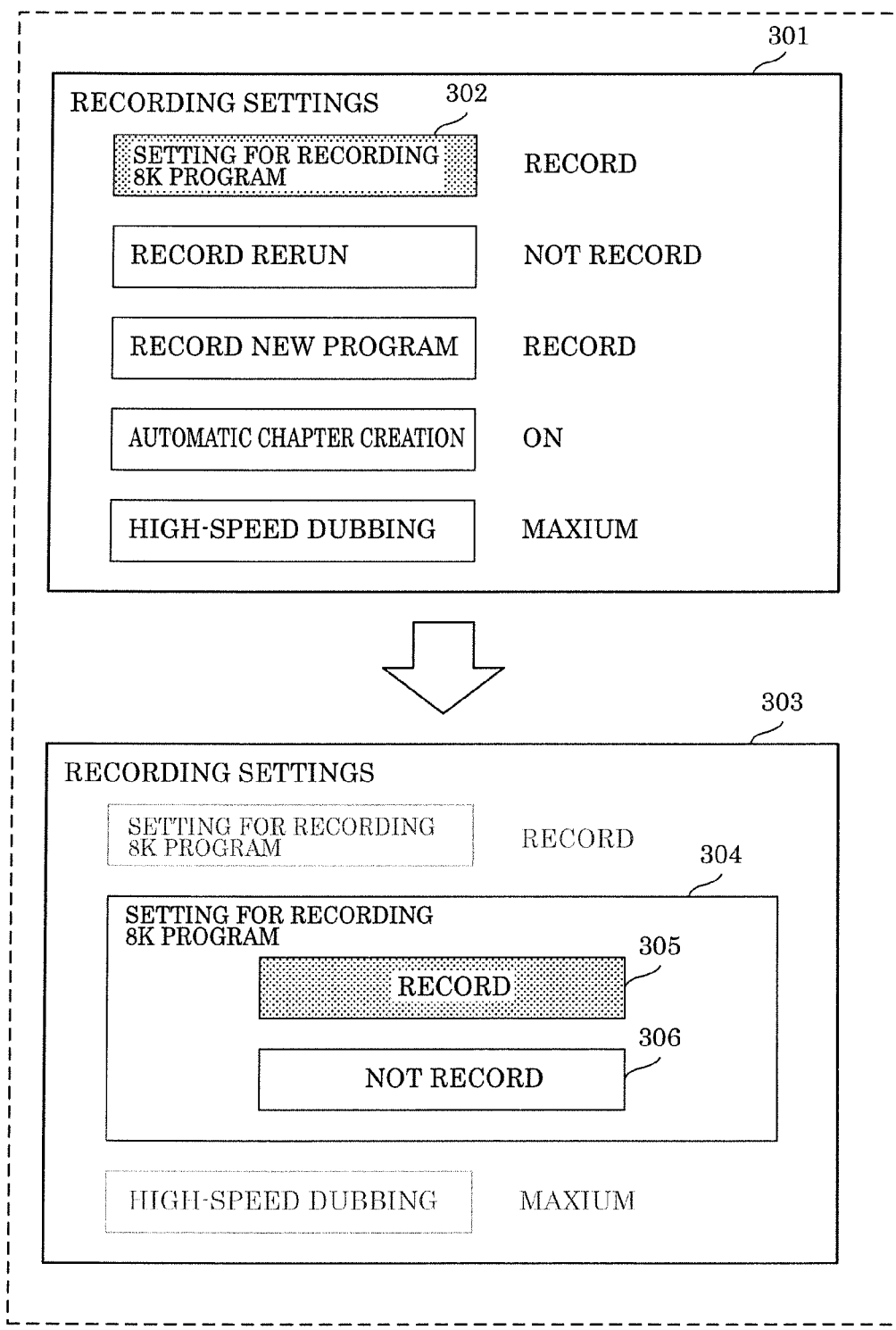
FIG. 5 shows example GUIs for changing settings of the recording device.

FIG. 5 shows example GUIs for changing the settings of the recording device.

GUI 301 is an example GUI for changing recording settings. For example, while display device 300 displays GUI 301, a user operates an input device such as a remote controller to select button 302 for "SETTING FOR RECORDING 8K PROGRAM" and make the decision. Once receiver 170 receives an input indicating this decision, controller 120 outputs GUI 303. Accordingly, display device 300 displays GUI 303. GUI 303 displays window 304 for "SETTING FOR RECORDING 8K PROGRAM" which displays "RECORD" button 305 and "NOT RECORD" button 306. Once a user selects "RECORD" button 305 and makes the decision, receiver 170 receives an input indicating the first setting and updater 180 updates the setting in memory 140 to the "first setting". On the other hand, once a user selects "NOT RECORD" button 306 and makes the decision, receiver 170 receives an input indicating the second setting and updater 180 updates the setting in memory 140 to the "second setting".

When recording medium 131 records an encoded stream undecodable by decoder 150, the user may input the encoded stream recorded in recording medium 131 to reproducing equipment that can decode the encoded stream to reproduce the encoded stream. In this case, recording medium 131 causes the reproducing equipment that can reproduce an optical disk, such as an ultra HD/BD, recording 4K contents to reproduce the encoded stream. Alternatively, recording medium 131 may be an external storage such as an external HDD or SSD. An external storage recording encoded streams may be connected to reproducing equipment which reproduces the encoded streams recorded in the external storage. When recording device 100 is connected to reproducing equipment via a network such as a local area network (LAN), the reproducing equipment obtains the encoded streams via the network from the recording device to reproduce the encoded streams.

A specific example of GUI 307 including a list will be described with reference to FIG. 6.

FIG. 6 shows an example GUI including a recording list.

GUI 307 is an example GUI for reproducing (decoding), in recording device 100, the encoded stream recorded in recording medium 131. For example, the recording list included in GUI 307 shows as follows. Icon "8K" represents that drama series A is an encoded stream including an 8K video stream, whereas icon "4K" represents that documentary C is an encoded stream including a 4K video stream. The fact that there is neither icon "8K" nor icon "4K" represents that each of news B and information program D is an encoded stream including a 2K video stream. In the recording list, icon 308 represents that drama series A is unreproducible by recording device 100. In the recording list, first display indicates a certain encoded stream (e.g., an encoded stream including an 8K video stream) undecodable by decoder 150, whereas second display indicates another encoded stream (e.g., an encoded stream including 2K and 4K video streams). The display form of the first display is different from the display form of the second display and represents that the certain encoded stream is unreproducible by recording device 100.

Note that icon 308 appears in display form of the first display, whereas icon 308 does not appear in the display form of the second display. The configuration is not limited thereto. The first display and the second display may be different display forms using characters or backgrounds in different colors, for example, the first display may be grayed out, whereas the second display may be black or white. Alternately, no icon may appear in the first display, whereas an icon may appear in the second display. One of the first display and second display may be surrounded by a frame.

2. Operation

Now, an operation of recording device 100 configured as mentioned above will be described.

Figure 7:
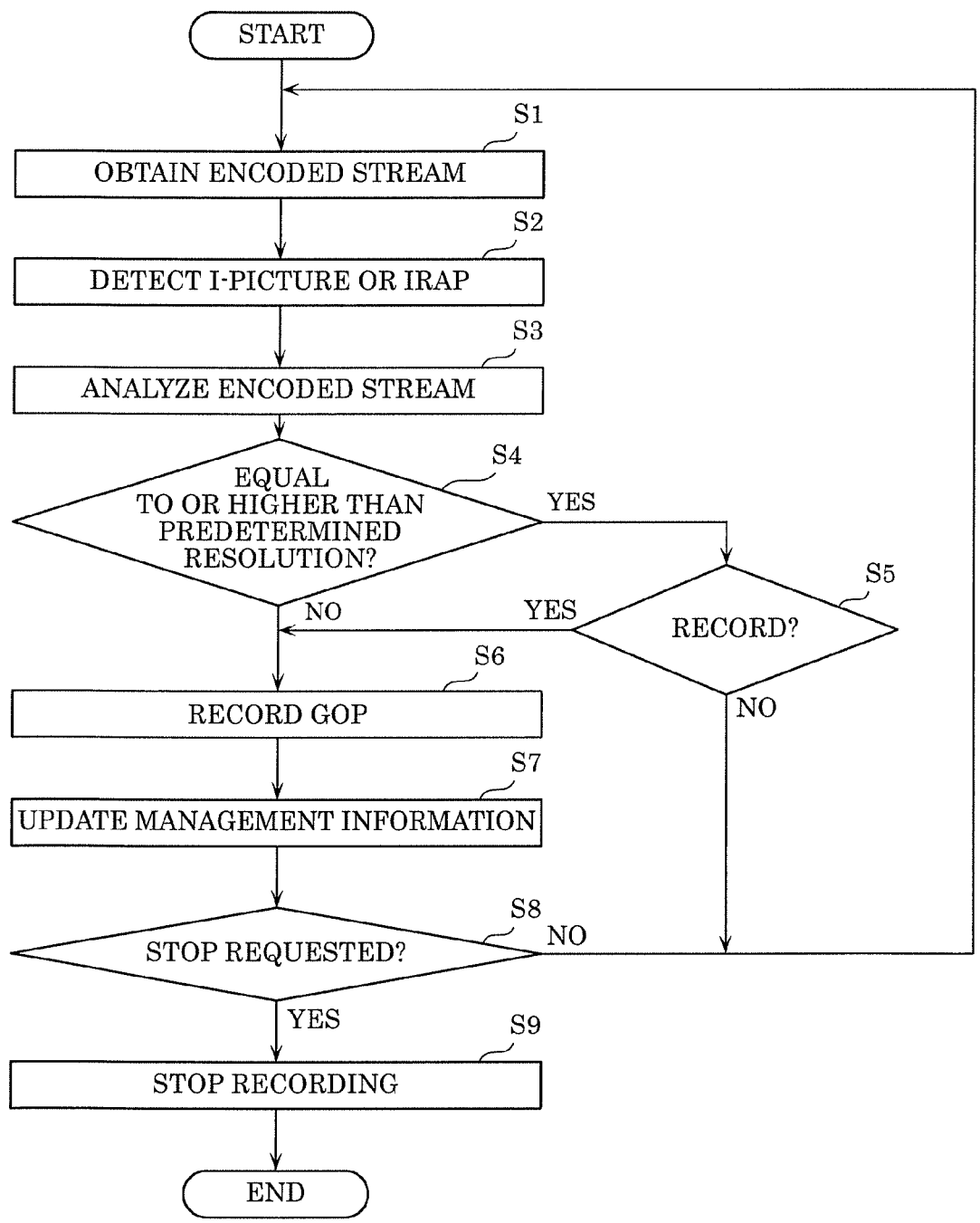
FIG. 7 is a flow chart showing an example operation of the recording device according to the embodiment.

FIG. 7 is a flow chart showing an example operation of the recording device according to the embodiment.

In recording device 100, obtainer 110 obtains an encoded stream (S1).

Next, controller 120 detects an I-picture or an IRAP of the encoded stream obtained by obtainer 110 (S2). Accordingly, controller 120 performs processing in units of a group of pictures (GOP) constituting the encoded stream. The I-picture or the IRAP is the top picture, which is decoded first, out of the pictures constituting a single GOP.

Controller 120 analyzes the encoded stream (S3).

Controller 120 determines whether a video stream included in the encoded stream has a resolution equal to or higher than a predetermined resolution (e.g., 8K) (S4).

Upon determination that the resolution is equal to or higher than the predetermined resolution (Yes in S4), controller 120 determines whether the setting stored in memory 140 is the setting (first setting) to record the video stream having a resolution equal to or higher than the predetermined resolution (S5). That is, controller 120 determines whether the setting stored in memory 140 is the first setting or the second setting.

If the setting stored in memory 140 is the first setting to record the video stream having a resolution equal to or higher than the predetermined resolution (Yes in S5), controller 120 records the obtained GOP in recording medium 131 using recorder 130 (S6). Note that controller 120 also executes step S6 upon determination in step S4 that the resolution is lower than the predetermined resolution (No in S4).

If the setting stored in memory 140 is the second setting to not record the video stream having a resolution equal to or higher than the predetermined resolution (No in S5), controller 120 does not record the obtained GOP and the process returns to step S1.

After step S6, controller 120 updates management information on the data recorded in recording medium 131 (S7). The management information is information on the recorded data indicating a presentation time stamp (PTS) of the recorded GOP or the recording position in recording medium 131, for example. Note that controller 120 may record a decoding time stamp (DTS) of the recorded GOP in addition to the management information.

Next, controller 120 determines whether there is a request for stop recording the encoded stream (S8). For example, controller 120 determines that there is a request for stop, when an encoded stream is recorded with a timer and the present time reaches the end of timer recording. Alternatively, controller 120 may determine that there is a request for stop, once receiver 170 receives an input signal indicating the end of recording, from an input device such as a remote controller of a user.

If controller 120 determines that there is a request for stop (Yes in S8), recorder 130 stops recording (S9).

If controller 120 determines that there is no request for stop (No in S8), the process returns to step S1.

3. Effects, etc.

As described above, recording device 100 according to this embodiment includes obtainer 110, decoder 150, and controller 120. Obtainer 110 obtains encoded streams. Decoder 150 decodes the obtained encoded streams. Controller 120 selectively performs the first control or the second control in accordance with the predetermined setting. In the first control, the encoded stream is recorded in recording medium 131, when an obtained encoded stream is undecodable by decoder 150. In the second control, the encoded stream is not recorded, when the obtained encoded stream is undecodable by the decoder.

This configuration allows the first control and the second control as follows, even when the encoded stream is undecodable by decoder 150. The first control is performed, when there is a setting to record the encoded stream, whereas the second control is performed, when there is a setting not to record the encoded stream. Accordingly, the device properly selects the first control to record, in recording medium 131, the encoded stream undecodable by decoder 150 or the second control not to record the encoded stream undecodable by decoder 150.

For example, when a user selects the setting to record an encoded stream undecodable by decoder 150 to reproduce the encoded stream using another piece of equipment, the encoded stream is recordable in recording medium 131. When a user selects the setting to not record an encoded stream undecodable by the decoder, recording device 100 does not record the unreproducible encoded stream. This allows lower consumption of the recording capacity of recording medium 131.

In recording device 100 according to this embodiment, controller 120 determines that an encoded stream is undecodable by decoder 150, when the required processing capacity regarding the processing speed required for the decoding the encoded stream exceeds the processing capacity of decoder 150.

Assume that the obtained encoded stream requires decoding at a processing speed higher than the processing speed of decoder 150. In this case, the device properly determines whether to perform the first control of the encoded stream or the second control of the encoded stream in accordance with the predetermined setting.

In recording device 100 according to this embodiment, the encoded stream includes a video stream. The required processing capacity is the processing capacity required for the decoding a video stream having a resolution equal to or higher than the predetermined resolution.

In this configuration, whether the encoded stream is undecodable by decoder 150 is determined using the resolution of the video stream included in the encoded stream, which facilitates the determination.

In recording device 100 according to this embodiment, assume that the predetermined setting indicates that the second control is to be performed. In this case, the video stream includes a first video stream having a resolution equal to or higher than the predetermined resolution and a second video stream lower than the predetermined resolution. In this case, controller 120 records the second video stream in recording medium 131 without recording the first video stream.

When the video stream including a mixture of the first video stream and the second video stream is obtained and the second control is performed, only the second video stream is, out of the first video stream and the second video stream, recordable in recording medium 131.

Recording device 100 according to this embodiment further includes memory 140, receiver 170, and updater 180. Memory 140 stores predetermined settings. Receiver 170 receives inputs of users. Updater 180 updates the predetermined setting stored in memory 140 to the first setting indicating the first control or the second setting indicating the second control in accordance with an input. Once obtainer 110 obtains an encoded stream, controller 120 selectively performs the first control or the second control in accordance with a predetermined setting stored in memory 140.

This configuration causes the device to selectively perform the first control or the second control in accordance with the setting selected by a user. This leads to proper selection of the first control or the second control.

Recording device 100 according to this embodiment further includes outputter 160. Outputter 160 creates a list of one or more encoded streams recorded in recording medium 131 and outputs the list to display device 300. In the list, first display indicates a certain encoded stream undecodable by decoder 150, whereas second display indicates another encoded stream. The display form of the first display is different from the display form of the second display and represents that the certain encoded stream is unreproducible by recording device 100.

With this configuration, even when decoder 150 cannot decode an encoded stream, the device uses a display form indicating the fact that the certain encoded stream recorded in recording medium 131 is not reproducible in the display form of the first display. Accordingly, a user easily identifies, in the list, the encoded stream unreproducible by recording device 100.

4. Others

In recording device 100 according to the embodiment described above, obtainer 110 obtains an encoded stream from broadcast waves received by antenna 200. The route is not limited thereto. The obtainer may obtain an encoded stream via a communication network such as an internet.

In recording device 100 according to the embodiment described above, controller 120 determines whether an encoded stream is undecodable by decoder 150 using the resolution of the encoded stream. The determination is however not limited thereto.

For example, controller 120 may make determination using the frame rate of the encoded stream. In this case, controller 120 may determine that an encoded stream including a video stream with a frame rate equal to or higher than a predetermined frame rate is undecodable by decoder 150.

Alternatively, controller 120 may make determination using the amount of information in an encoded stream per unit time. In this case, controller 120 may determine that an encoded stream including a predetermined amount or more of information per unit time is undecodable by decoder 150.

Controller 120 may determine that an encoded stream is undecodable by decoder 150, when the encoded stream is under a standard incompatible with decoder 150.

The embodiment has been described above as an example technique of the present disclosure. The accompanying drawings and the detailed description have been provided for this purpose.

Accordingly, the constituent elements included in the accompanying drawings and the detailed description may include not only those essential to achieve the objective of the present disclosure, but also those not essential to achieve the objective. For this reason, these non-essential constituent elements should not be immediately construed as being essential based on the fact that they are included in the accompanying drawings or the detailed description.

The embodiment described above is an illustrative example of the present disclosure, and various modifications, substitutions, additions, and omissions may be made within the scope of the claims or equivalents thereof.

INDUSTRIAL APPLICABILITY

The present disclosure is applicable to a recording device and a recording method, for example, capable of properly determining whether or not to record an undecodable encoded stream in a recording medium.

The invention claimed is:

1. A recording device that records an encoded stream in a non-transitory recording medium, the recording device comprising:
  a first receiver that obtains the encoded stream;
  a decoder that decodes the encoded stream obtained; and
  a controller that selectively performs, in accordance with a predetermined setting, first control to record the encoded stream in the non-transitory recording medium, when the encoded stream obtained is undecodable by the decoder, or second control to not record the encoded stream, when the encoded stream obtained is undecodable by the decoder, wherein:
  the encoded stream includes a video stream,
  a required processing capacity is a processing capacity required for decoding the video stream having a resolution equal to or higher than a predetermined resolution, and
  when the predetermined setting indicates that the second control is to be performed and the video stream includes a first video stream having a resolution equal to or higher than the predetermined resolution and a second video stream having a resolution lower than the predetermined resolution, the controller records the second video stream in the non-transitory recording medium without recording the first video stream.

2. The recording device according to claim 1, wherein the controller determines that the encoded stream is undecodable by the decoder, when the required processing capacity exceeds a processing capacity of the decoder.

3. The recording device according to claim 1, further comprising:
  a non-transitory memory that stores the predetermined setting;
  a second receiver that receives an input of a user; and
  an update controller that updates, in accordance with the input, the predetermined setting stored in the non-transitory memory to a first setting indicating that the first control is to be performed or a second setting indicating that the second control is to be performed, wherein
  the controller selectively performs the first control or the second control in accordance with the predetermined setting stored in the non-transitory memory when the first receiver obtains the encoded stream.

4. The recording device according to claim 1, further comprising:
  an output controller that generates a list of one or more encoded streams recorded in the non-transitory recording medium, and outputs the list to a display device, wherein
  in the list, first display indicates a certain encoded stream undecodable by the decoder, whereas second display indicates another encoded stream, and
  a display form of the first display is different from a display form of the second display and represents that the certain encoded stream is unreproducible by the recording device.

5. A recording method executed by a recording device including a decoder that decodes an encoded stream and recording an encoded stream in a non-transitory recording medium, the recording method comprising:
  obtaining the encoded stream;
  decoding the encoded stream obtained; and
  selectively performing, in accordance with a predetermined setting, first control to record the encoded stream in the non-transitory recording medium, when the encoded stream obtained is undecodable by the decoder, or second control to not record the encoded stream, when the encoded stream obtained is undecodable by the decoder, wherein:
  the encoded stream includes a video stream,
  a required processing capacity is a processing capacity required for decoding the video stream having a resolution equal to or higher than a predetermined resolution, and
  the recording method further comprises, when the predetermined setting indicates that the second control is to be performed and the video stream includes a first video stream having a resolution equal to or higher than the predetermined resolution and a second video stream having a resolution lower than the predetermined resolution, recording the second video stream in the non-transitory recording medium without recording the first video stream.

* * * * *